United States Patent [19]
Edwards et al.

[11] 3,885,834
[45] May 27, 1975

[54] VARIABLE TRACK WHEELS

[75] Inventors: Michael Frederick Edwards; Edward Williams, both of Wolverhampton, England

[73] Assignee: GKN Sankey Limited, Bilston, Stafford, England

[22] Filed: Dec. 6, 1973

[21] Appl. No.: 422,598

[30] Foreign Application Priority Data
Dec. 7, 1972 United Kingdom............... 56532/72

[52] U.S. Cl............................. 301/9 TV; 301/36 R
[51] Int. Cl............................................ B60b 27/00
[58] Field of Search............. 301/9 TV, 9 DN, 36 R

[56] References Cited
UNITED STATES PATENTS
| | | | |
|---|---|---|---|
| 2,693,392 | 11/1954 | Grosch............................. | 301/9 TV |
| 2,852,312 | 9/1958 | Temple............................. | 301/9 TV |
| 2,963,317 | 12/1960 | Stough............................. | 301/9 TV |
| 3,586,381 | 6/1971 | Siegel............................. | 301/9 TV |

Primary Examiner—M. Henson Wood, Jr.
Assistant Examiner—D. W. Keen
Attorney, Agent, or Firm—Merriam, Marshall, Shapiro & Klose

[57] ABSTRACT

A wheel comprising a rim, a separate disc, a number of rails arranged helically on the inner surface of the rim, guides on the disc which engage the rails whereby as relative rotation takes place between the rim and disc their relative positions change in directions parallel to the rotary axis of the wheel, locking means on the guides operable frictionally to engage the rails to lock the disc and rim in a desired relative position, at least one of the guides carrying a set pin arranged to engage the rail engaged by the locking means to supplement the locking effect of the latter.

3 Claims, 3 Drawing Figures

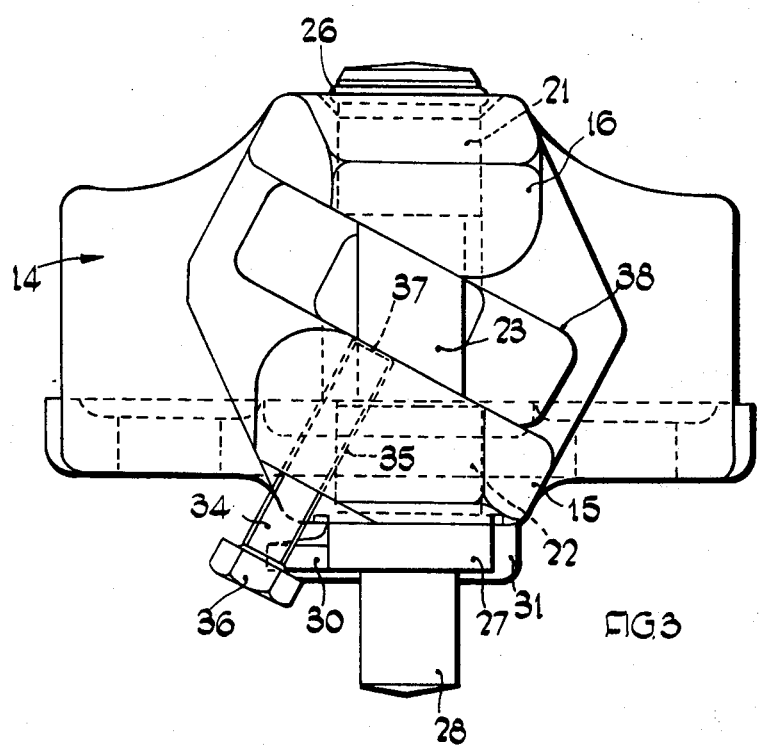

VARIABLE TRACK WHEELS

BACKGROUND OF THE INVENTION

This invention relates to power-adjusted, variable-track wheels. Such wheels are used, for example, on agricultural tractors, the power of the tractor engine being used to vary the track of the wheels.

More particularly, the invention is concerned with wheels, hereinafter referred to as being of the kind specified, comprising a rim, a separate disc, a number of rails arranged helically on the inner surface of the rim, guides on the disc which engage the rails whereby as relative rotation takes place between the rim and the disc their relative positions change in directions parallel to the rotary axis of the wheel, and locking means on the guides operable frictionally to engage the rails to lock the disc and rim in a desired relative position.

To change the track of a wheel, the locking means are released, a stop is located on at least one rail on each wheel to be adjusted and the discs, which are connected to the tractor drive, are rotated relative to the rims which engage the ground through the tyres thereof so that relative rotation takes place between the discs and the rims until the guides have come up against the stops whereupon the locking means are operated. Normally the rails are provided with holes extending transversely therethrough and the stops are positioned on the rails by bolts or pins passing through holes in the stops and the appropriate holes in the rails.

Various forms of locking means are known. Normally a locking element is moved radially outwardly of the rotary axis of the wheel frictionally to engage the inwardly facing surface of the rail. The main types of locking means are an eccentric pin which is rotated to bring a block into engagement with the rail, a screw jack whose head includes a yoke arranged to be moved radially outwardly into engagement with the rail and a double-ramp arrangement in which one ramp is moved over another ramp and into engagement with the rail.

While these types of locking means have been in use for a number of years satisfactorily, the power of tractors has gradually increased and it has been found that the conventional types of locking means are hardly adequate to prevent slipping between the discs and the rims during operation. Attempts have been made to prevent this slipping by increasing the frictional forces between the locking elements and the rails. As the frictional forces are increased, greater manual effort has to be applied to operate the locking means and the greater the radial forces the more likelihood is there that the rim will be deformed as the locking means are operated.

It is an object of the present invention to provide an improved construction of wheel of the kind specified.

SUMMARY OF THE INVENTION

According to the invention we provide a wheel comprising a rim, a separate disc, a number of rails arranged helically on the inner surface of the rim, guides on the disc which engage the rails whereby as relative rotation takes place between the rim and disc their relative positions change in directions parallel to the rotary axis of the wheel, locking means on the guides operable frictionally to engage the rails to lock the disc and rim in a desired relative position, at least one of the guides carrying a set pin arranged to engage the rail engaged by the locking means to supplement the locking effect of the latter.

In operation of this arrangement, when it is desired to adjust the track of the wheel, the or each set pin is withdrawn out of engagement with the associated rail and the locking means are released, the disc and the rim are relatively rotated to adjust the track to the desired spacing and the locking means are then operated and the or each set pin is tightened into engagement with the associated rail thus supplementing the locking effect of the locking means.

Preferably the or each set pin engages the side face of the associated rail, i.e. one of the faces other than the inner face which is engaged by the locking means and the outer face which is juxtaposed to the inner face of the rim. By arranging the set pin to engage the side face of the rail the likelihood of radial distortion of the wheel is reduced.

Preferably on the or each guide carrying a set pin the locking means and set pin are associated with each other in such a manner that the locking means cannot be released until the set pin has been screwed out of engagement with the rail rim. This association of the locking means and the set pin prevents the scoring of the rail by the set pin which might occur should the locking means be released before or engaged after the set pin.

Where the locking means is an eccentric pin which is carried in the guide, the set pin can be arranged adjacent to the eccentric pin and generally perpendicular to the rail. The eccentric pin may be provided with an abutment arranged, upon rotation of the eccentric pin when the set pin is in contact with the rail, to contact the set pin thereby preventing the eccentric pin rotating sufficiently to release the contact between the block and rail. This prevents the release of the locking means before the set pin.

If the locking means is in the form of a screw jack then the yoke at the head of the screw jack which engages the rail will carry the set pin. If the locking means is of the double ramp arrangement then one of the ramps will carry the set pin.

Preferably the or each set pin is hardened or has a hardened free end and the rails are made from a softer material than the associated set pin or pins so that the or each pin indents the rail when tightened into engagement therewith. This enables relative rotation between the disc and rim to be effectively resisted as there is a positive location between the set pin and rail and not a purely friction contact between these components.

BRIEF DESCRIPTION OF THE DRAWINGS

An embodiment of the invention will now be described in detail by way of example with reference to the accompanying drawings in which:

FIG. 3 is a plan view of a guide which is used in the wheel of FIGS. 1 and 2.

DESCRIPTION OF A PREFERRED EMBODIMENT

Figure 1:
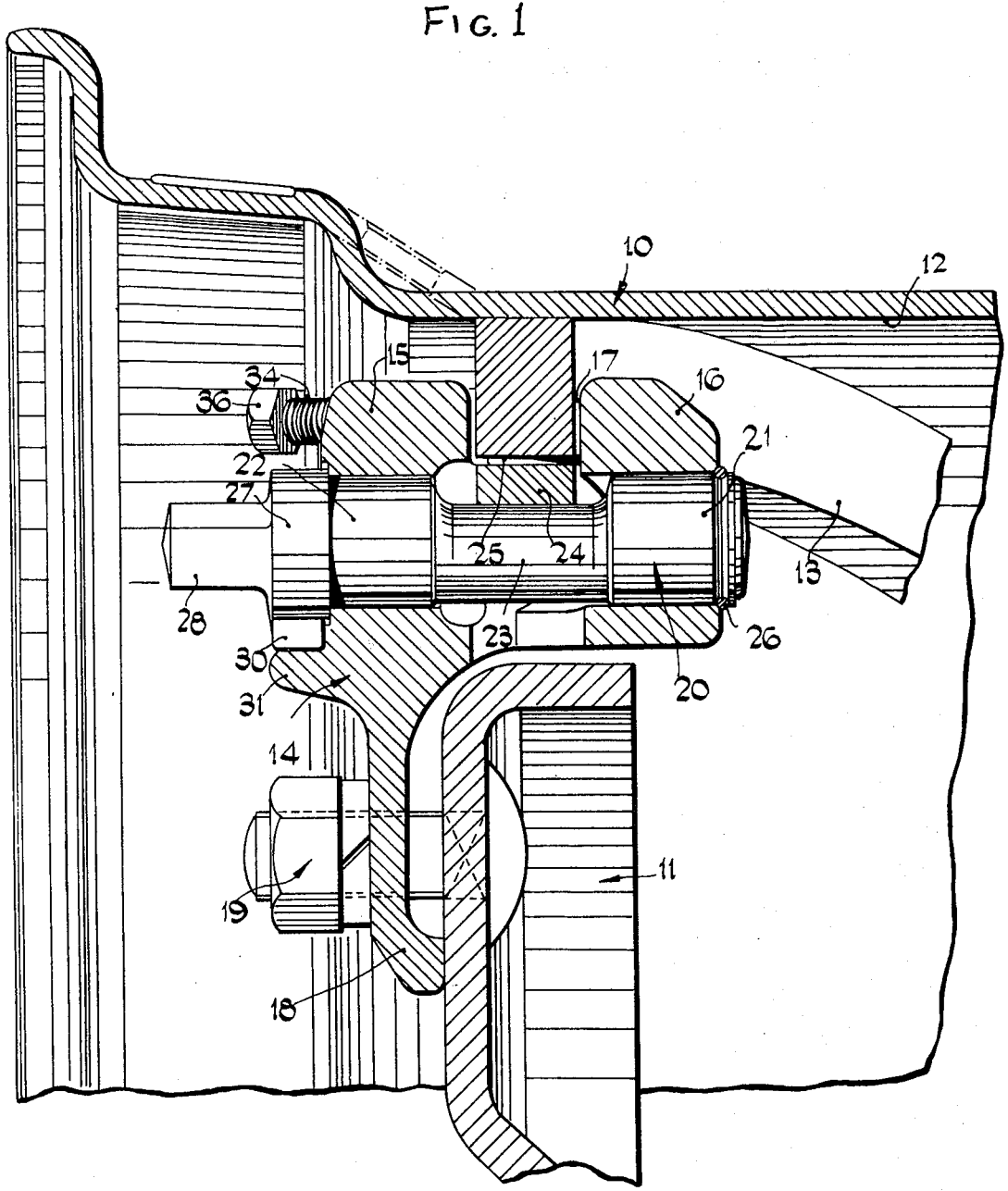
FIG. 1 is a partial cross section through a wheel embodying the present invention.

Referring to the drawings the wheel rim is indicated generally at 10 and the wheel disc at 11. The wheel rim has a number of helical rails secured to the inner surface 12 thereof, one of the rails secured to the inner surface being indicated at 13. Each rail is engaged by a guide which is secured to the disc, one of the guides being indicated at 14. The guides are generally of channel shape having two limbs 15 and 16 which define a channel 17 within which the rail 13 is received. Each guide has a flange 18 which is secured to the disc 11 by a pair of nut and bolt assemblies indicated generally at 19.

Each guide is provided with a locking means in the form of a pin indicated generally at 20 having cylindrical end portions 21 and 22 which are received in aligned bores in the limbs 15 and 16 and a central eccentric portion 23. The eccentric portion is arranged between the limbs 15 and 16 and engages a block 24 which is retained within an aperture 38 in the guide. Upon turning of the pin, the block 24 is forced into frictional contact with the inwardly face surface 25 of the rail 13 to lock the disc to the rail and thus to the rim.

The pin 20 is located axially at one end by means of a circlip 26 and at its other end by a head 27 from which projects a square section spigot 28 whereby the pin can be turned. The limit positions of the pin are determined by means of a lug 30 extending from the head which engages a ledge 31 on the guide. The pin can be turned substantially through 230° relative to the position shown in FIG. 2 until the lug 30 engages the ledge 31, this turning of the pin causing the block 24 to engage the inner surface of the rail 13.

The guides 14 are each provided with a set pin 34 which is received in a threaded bore 35 in the limb 15 of the guide. The set pins each have a hexagon head 36 and a hardened end 37 shaped to aid penetration of the associated rails which are made of softer material. For example, the end 37 of each set pin may be slightly concave so that the edge of the end of each pin can bite into or indent the rail and thus supplement the locking effect of the eccentric pins. It will be noted that the longitudinal axes of the pins are substantially perpendicular to the lengths of the channels 17 between the limbs 15 and 16 and therefore the pin 34 will engage the side surfaces of the rails such as 13 engaged in the guides.

It will be appreciated that the set pins are screwed out of engagement with the rails while adjustment of the wheel track is taking place. The position of each set pin relative to the associated eccentric pin is such that with the set pin and block 24 both in contact with the rail the eccentric pin cannot be rotated in an anticlockwise direction sufficiently to release the frictional contact between the block 29 and the rail 13 as the lug 30 on the head 27 of the eccentric pin will foul the head. In order to release the frictional contact between the block 24 and the rail 13 it is therefore necessary first to unscrew the associated set pin sufficiently to enable the lug 30 on the set pin head 27 to clear the head 36 of the set pin. This ensures that the block 24 cannot be released before the set pin thereby preventing the danger of the scoring of the side of the rail by the set pin which might arise should the frictional contact between the block 24 and rail 13 be released first. Conversely it is also necessary to clamp the pad 24 in engagement with the rail 13 by rotating the eccentric pin 20 before the set pin is screwed into engagement with the rail.

Figure 2:
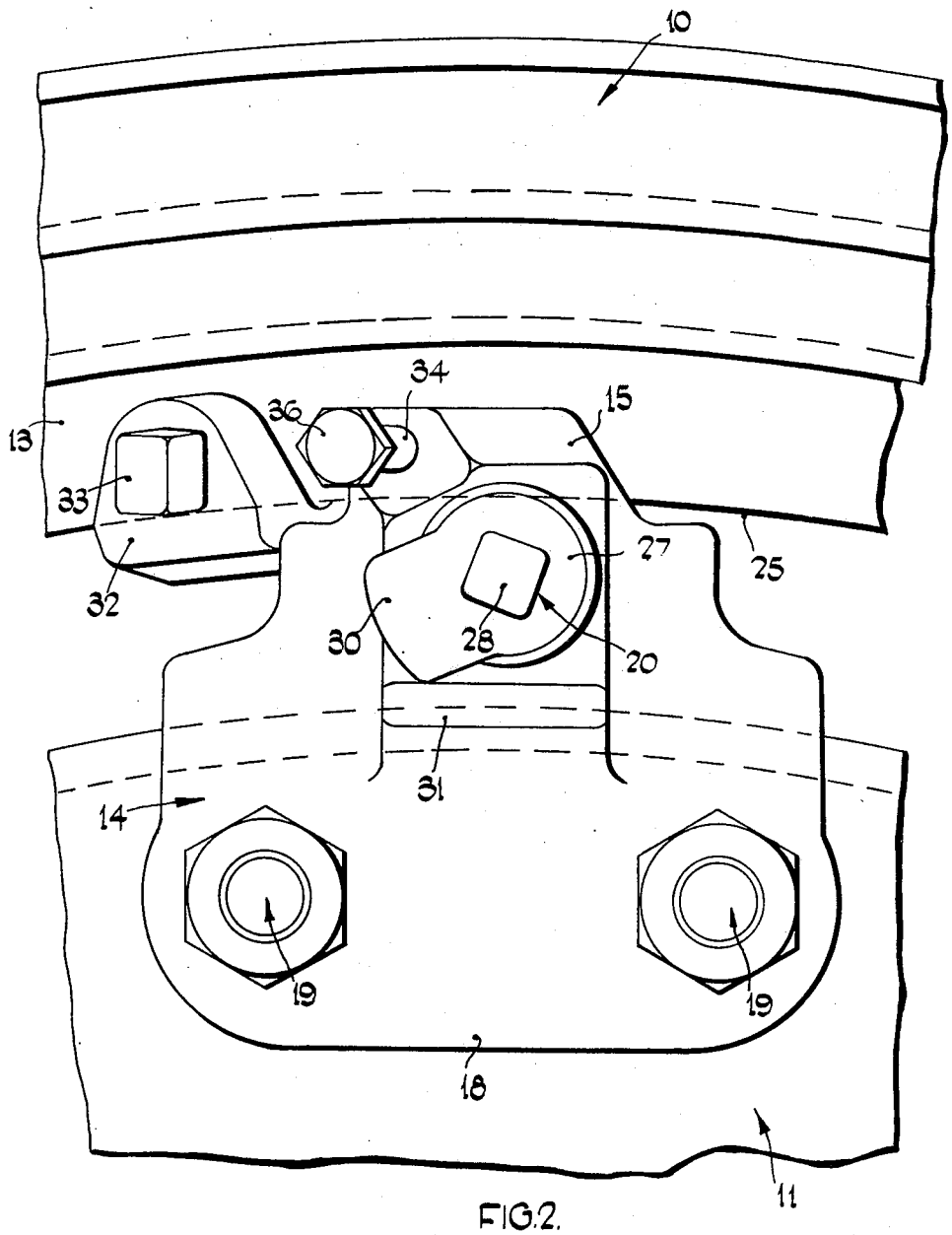
FIG. 2 is a partial end elevation of the wheel of FIG. 1.

FIG. 2 shows a U-shaped stop member 32 which straddles the rail 13 and is secured thereto by means of a pin 33 which extends through apertures in the rail and stop member. A portion of the pin and at least one of the apertures through which it extends is screw-threaded in order to retain the pin in position.

Adjustment of the track of the wheel is made as follows. The set pins 34 are screwed out of engagement with the rails and the eccentric pins 20 are turned to the position shown in order to release the frictional engagement between the blocks 24 and the rails. A stop such as 32 is arranged on at least one rail in a position corresponding to the desired track and relative rotation between the disc and rim takes place until a guide engages the stop. The pins 20 are then turned to force the pads 24 into engagement with the rails thus locking the disc and the rim together and the set pins 34 are then screwed into engagement with the rails in order to supplement the locking effect of the pins 20.

Although in the arrangement described above each guide is provided with a set pin this, though preferable, is not essential. It may be possible in certain applications only to use a set pin on one or two of the guides of a wheel of the kind specified.

As has been described above, if other forms of locking means such as a screw jack or a double ramp are used then a pin such as 34 will be carried by the jack or one of the ramps so as to engage the rail to supplement the locking effect of the friction locking device.

It will be seen that the invention provides a simple arrangement for improving the locking of disc and rim in a wheel of the kind specified.

I claim:

1. A wheel comprising a rim, a separate disc, a number of part helical rails secured on the radially inner surface of the rim, guides secured to the disc which engage the rails whereby as relative rotation takes place between the rim and disc their relative positions change in directions parallel to the rotary axis of the wheel, locking means on each of the guides operable frictionally to engage radially inwardly facing surfaces on the rails by applying forces directed outwardly of the centre of the wheel to said inwardly facing surfaces to lock the disc and rim in a desired relative position, at least one of the guides carrying a set pin in addition to the locking means, said set pin being arranged to engage the side face of the rail engaged by the locking means to supplement the locking effect of the latter.

2. A wheel comprising a rim, a separate disc, a number of part helical rails secured on the radially inner surface of the rim, guides secured to the disc which engage the rails whereby as relative rotation takes place between the rim and disc their relative positions change in directions parallel to the rotary axis of the wheel, locking means on each of the guides operable frictionally to engage the rails to lock the disc and rim in a desired relative position, at least one of the guides carrying a set pin in addition to the locking means, said set pin being arranged to engage the side face of the rail engaged by the locking means to supplement the locking effect of the latter and being assocuated with the locking means in such a manner that the locking means cannot be released until the set pin has been screwed out of engagement with the rail.

3. A wheel comprising a rim, a separate disc, a number of part helical rails secured on the radially inner surface of the rim, guides secured to the disc which engage the rails whereby as relative rotation takes place between the rim and disc their relative positions change in directions parallel to the rotary axis of the wheel, locking means on each of the guides in the form of an eccentric pin arranged upon rotation to bring a block into engagement with the associated rail in order to lock the disc and rim in a desired relative position, at least one of the guides carrying a set pin in addition to the eccentric pin and block, said set pin being arranged to engage the side face of the rail to supplement the locking effect of the eccentric pin and block, the or each set pin being arranged adjacent the associated eccentric pin and the eccentric pin of each guide carrying a set pin being provided with an abutment arranged, upon rotation of the eccentric pin when the set pin is in contact with the rail, to contact the set pin thereby preventing the eccentric pin rotating sufficiently to release the contact between the block and rail.

* * * * *